United States Patent [19]
Holcombe

[11] Patent Number: 5,256,251
[45] Date of Patent: Oct. 26, 1993

[54] PROCESS FOR DRYING AND SOLVENT-EXTRACTION OF SOLIDS AND SLUDGES

[75] Inventor: Thomas C. Holcombe, Mountain Lakes, N.J.

[73] Assignee: Hanover Research, East Hanover, N.J.

[21] Appl. No.: 712,723

[22] Filed: Jun. 10, 1991

[51] Int. Cl.$^5$ .......................... B01D 1/26; C02F 1/04
[52] U.S. Cl. ........................................ 159/47.3; 34/9; 34/10; 34/57 R; 159/2.1; 159/17.2; 159/17.3; 159/20.1; 159/901; 159/DIG. 8; 202/174; 203/14; 203/71; 203/88; 210/712; 210/770; 210/806
[58] Field of Search ................ 159/17.2, 2.1, 901, 159/47.3, 17.3, DIG. 8, DIG. 40, 20.1; 202/174, 182, 265; 203/14, 71, 88; 34/917, 10, 57 R; 210/712, 770, 806

[56] References Cited

U.S. PATENT DOCUMENTS

| | | | |
|---|---|---|---|
| Re. 26,317 | 12/1967 | Greenfield | 159/17 |
| Re. 26,352 | 2/1968 | Greenfield | 159/13 |
| Re. 31,185 | 3/1983 | Greenfield et al. | 159/1 |
| 2,888,449 | 5/1959 | Borck | 159/905 |
| 3,716,458 | 2/1973 | Greenfield et al. | 203/11 |
| 3,855,079 | 12/1974 | Greenfield | 203/47 |
| 3,929,586 | 12/1975 | Slikkers, Jr. | 159/905 |
| 3,950,230 | 4/1976 | Greenfield et al. | 203/47 |
| 4,013,516 | 3/1977 | Greenfield et al. | 201/2.5 |
| 4,097,378 | 6/1978 | St. Clair | 159/905 |
| 4,270,974 | 6/1981 | Greenfield et al. | 159/16 |
| 4,289,578 | 9/1981 | Greenfield et al. | 159/47 WL |
| 4,336,101 | 6/1982 | Greenfield et al. | 159/16 |
| 4,422,940 | 12/1983 | Cousino et al. | 159/905 |
| 4,495,161 | 1/1985 | Cameron et al. | 159/47.1 |
| 4,662,990 | 5/1987 | Bonanno | 159/905 |
| 4,702,798 | 10/1987 | Bonanno | 159/47 |

FOREIGN PATENT DOCUMENTS

333547 8/1930 United Kingdom ............... 159/17.2

Primary Examiner—Virginia Manoharan
Attorney, Agent, or Firm—E. Lieberstein

[57] ABSTRACT

A continuous evaporation process for drying water-wet waste solids and sludges, using a paraffin oil solvent, until the waste is dried to a near-zero wastewater product, without experiencing sticky solids. The invention involves (1) mixing the input solids or sludges with a paraffin oil solvent, (2) feeding the mixture into two or more stages of evaporation in parallel to evaporate some of the water present in the input solids or sludges and to extract some of the indigenous solvent-soluble compounds from the solids, (3) feeding the slurry from the parallel stages of evaporation to one or more final evaporation stages in series, and (4) feeding the slurry from the final stages of evaporation to a centrifuge or other device for separating most of the solvent from the solids.

11 Claims, 4 Drawing Sheets

PROCESS FOR DRYING AND SOLVENT-EXTRACTION OF SOLIDS AND SLUDGES

BACKGROUND OF THE INVENTION

1. Field of the Invention

This invention relates to a process for the drying of water-wet solids and sludges of various kinds, for solvent-extraction of indigenous solvent-soluble compounds from said solids and sludges, and for recovering solids, water, and indigenous solvent-soluble compounds for further use. More particularly, it deals with a continuous process for drying and solvent-extraction of solids and sludges wherein the input material is mixed with water-immiscible solvents of various kinds to obtain a mixture that remains fluid and pumpable even after virtually all of the water has been removed, and to extract indigenous solvent-soluble compounds from the input material.

2. Discussion of the Prior Art

Drying and solvent-extraction of water-wet solids and sludges (hereinafter referred to as "waste solids") is the object of large and varied industries. Examples of waste solids requiring such treatment include, but are not limited to:

(1) Municipal and industrial sewage sludges, such as raw primary sludges, waste activated sludges, anaerobically digested sludges, and biosludges;
(2) Animal wastes, such as pig manures, wool-scouring wastes, chicken manures, and cow manures;
(3) Contaminated soils, such as soils contaminated with crude oils, fuel oils, polychlorinated biphenyls, polynuclear aromatics, coal tars, and oil drilling muds;
(4) Refinery sludges, such as API separator sludges, dissolved air flotation floats, and slop oil emulsion solids;
(5) Ink and dye sludges;
(6) Alum sludges;
(7) Wood pulp mill activated sludges and black liquirs;
(8) Pharmaceutical plant wastes;
(9) Brewery sludges;
(10) Dairy and food products and wastes, such as milk whey by-products, coffee wastes, and chocolate wastes;
(11) Peats, lignites, and brown coals; and
(12) Meat rendering wastes.

Drying and solvent-extraction of waste solids present many processing problems relative to the efficiency and reliability of production. Various typical processes for dehydrating waste solids using solvent extraction technologies are disclosed in U.S. Pat. Nos. Re. 26,317; Re. 26,352; 3,323,575; 3,716,458; 3,855,079; 3,950,230; 4,013,516; 4,270,974; 4,418,458; 4,336,101; and 4,702,798.

In general, the processes and apparatus described in the aforementioned patents involve slurrying waste solids, such as one or a combination of the types listed above, with a water-immiscible solvent to obtain a mixture which remains fluid and pumpable even after virtually all of the water has been removed. The properties of the solvent can be varied over a wide range to achieve the desired characteristics. The solvent should be immiscible in water and should have an atmospheric boiling point of 300° F. or higher to prevent excessive evaporation of the solvent during the evaporation of water from the solvent. The viscosity of the solvent should be low enough, typically less than 500 cp, so that the slurry is pumpable at the flowing temperatures. Extraction of compounds from the input waste solids can be enhanced by changing the chemical composition of the solvent to increase the solubility of the compounds in the solvent. The chemical composition of the solvent can also be adjusted to improve the dispersibility of the waste solids in the solvent. Isopar "L" and Amsco 140 are the trade names for solvents which meet the above criteria and have been used in these processes. Isooctanol is an example of another solvent which has been used in these processes.

The resulting mixture of solvent and waste solids is passed through a sequence of drying steps in which the mixture is dried by heat evaporation, becoming increasingly dry during each subsequent step. Economies of energy consumption are realized by utilizing the evolved vapor from each evaporation step to supply a substantial portion of the heat requirements of another evaporation step. The evaporation steps generate a slurry of dried or partially-dried solids in solvent which is withdrawn and fed to a centrifuge (or other apparatus for separating liquids from solids) to separate a substantial portion of the solvent from the solids. The solids leaving the centrifuge are sometimes processed further by heating them in a "desolventizer", referred to as a cake deoiler and specifically disclosed in U.S. Pat. No. 4,270,974. In the desolventizer, blowing steam, purge gas, and/or vacuum are used to recover virtually all of the remaining solvent from the solids. In many cases, the centrifuge centrate is fed to a distillation system where the indigenous solvent-soluble compounds extracted from the solids are separated from the solvent and recovered for final disposition.

It has been found that, when solids containing non-adsorbed (or "free") water are suspended in solvent, they may become "sticky" and form relatively large masses that adhere to the inner walls of the pipelines, heat exchanger tubes, and vessels. There are also cases where circulation is prevented due to the sticky solids settling out and plugging the pipelines or circulating pumps. The sticky solids may coat the heat exchanger surfaces, reducing the heat transfer rate in the heat exchangers so that the water evaporation rate is reduced markedly and the capacity of the evaporation system becomes low. Further, when the sticky solids adhere to the walls of the pipelines, heat exchangers, or vessels, they may cause corrosion if the solids are acidic in nature or contain other corrosive compounds. There are also cases where sticky solids in mixing tanks have a tendency to settle out and disproportionate amounts of water-wet solids in solvent are pumped to the evaporation stages, causing upsets in the stability of the system. Improvements have been developed in the processes and apparatus to overcome the problems of sticky solids. In one case, described in U.S. Pat. No. Re. 31,185, a portion of the slurry containing dried or partially-dried solids and solvent from one of the evaporation steps is recycled and mixed with the input material to reduce the average moisture content (thereby eliminating the "free" water present) of the material entering the first evaporation stage. In another case, described in U.S. Pat. No. 4,702,798, a surface active agent is mixed with the solvent and input material to prevent the formation of sticky solids and to keep the solids well-dispersed in the solvent. While successful in overcoming the problems of sticky solids, each of these improvements involves substantial increases in the cost of processing, either through higher flow rates, larger and more complex process equipment, and/or the added cost for surface active agents.

SUMMARY OF THE INVENTION

In accordance with the present invention, the formation of sticky solids is overcome by subjecting the wet slurry comprising a mixture of waste solids and solvent through a plurality of dehydration steps employing at least two evaporation stages with the wet slurry fed to at least each of the first two stages concurrently in a parallel arrangement relative to each other. By way of definition, "evaporation stage" refers to the equipment in which slurry is heated and a portion of the water and solvent is evaporated and the evolved vapors are separated from the remaining slurry. The first stage of evaporation corresponds to the first step of dehydration and the second stage corresponds to the second step of dehydration, etc.

The evolved vapors from all but one of the stages of evaporation are used to heat other stages in a co-current, counter-current, or alternative arrangement relative to the slurry flow.

The process of the present invention broadly comprises a continuous process for drying and solvent extraction of water-wet solids and sludges without experiencing sticky solids comprising the steps of (a) forming a wet slurry mixture of said waste solids and a water immiscible solvent with said water immiscible solvent having an atmospheric boiling point above 300° F. and a viscosity of less than 500 cp, (b) passing said wet slurry mixture through a dehydration operation including a plurality of at least three stages of evaporation with said wet slurry mixture fed concurrently to at least the first two stages of evaporation in a parallel arrangement, (c) separating the dehydrated waste solids from the water immiscible solvent, and (d) recycling said water immiscible solvent separated from said dehydrated waste solids in said continuous process for forming said wet slurry mixture.

BRIEF DESCRIPTION OF THE DRAWINGS

The advantage of the present invention will become apparent from the following detailed description when read in conjunction with the accompanying drawings of which.

DETAILED DESCRIPTION OF THE INVENTION

Figure 1A:
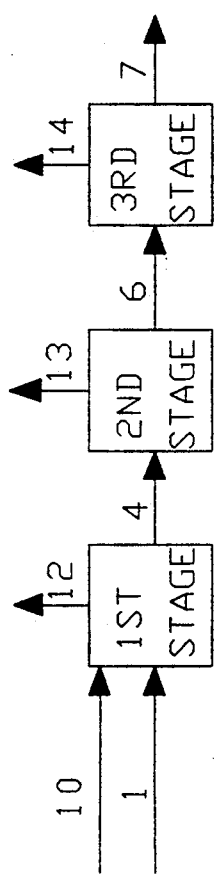
FIG. 1A is a simplified block diagram of a prior art dehydration system containing three stages of evaporation.
Figure 1B:
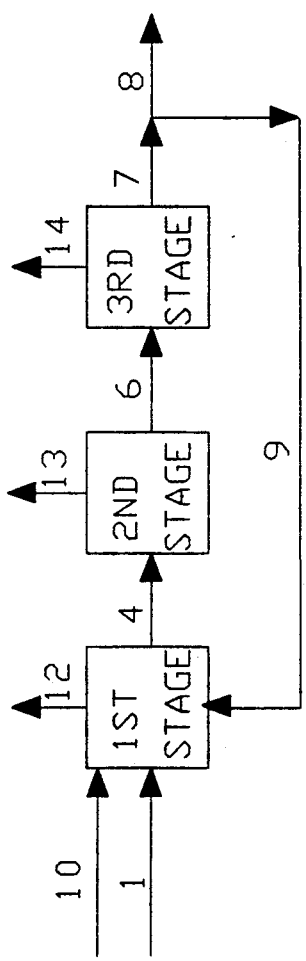
FIG. 1B is another simplified block diagram of a dehydration system of the prior art containing three stages of evaporation with partial recycle from the last stage of evaporation to the first stage of evaporation.
Figure 1C:
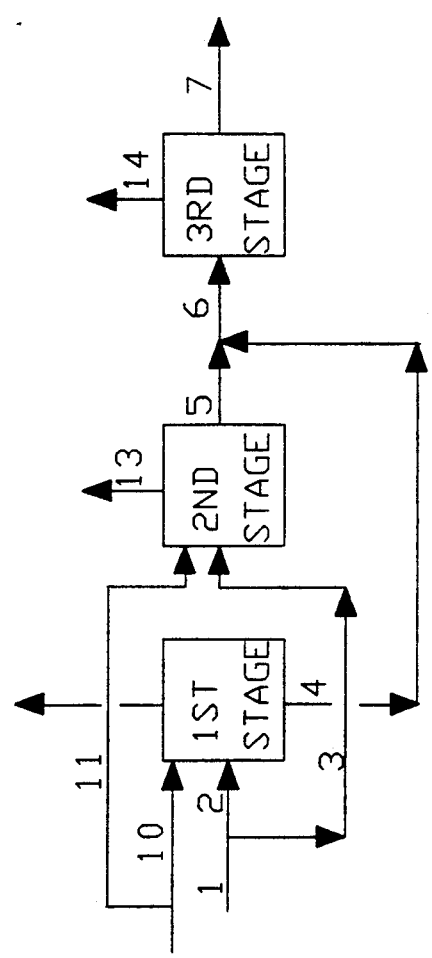
FIG. 1C is a block diagram of the dehydration system of the present invention.

Consider examples of the process in which anaerobically-digested municipal sludge containing 80 percent water is to be dried in a three-stage evaporation system. FIGS. 1A, 1B, and 1C depict simplified block flow diagrams for various processing schemes. Line 1 corresponds to the input waste solids to the process in each diagram. Line 10 corresponds to the solvent being fed to the first stage. Line 4 corresponds to the partially-dried slurry leaving the first stage of evaporation. Line 6 corresponds to the slurry being fed to the third stage of evaporation. Line 7 corresponds to the dried slurry leaving the third stage. Lines 12, 13, and 14 correspond to the evolved vapors leaving the first, second, and third stages of evaporation, respectively. In FIG. 1B, line 9 corresponds to a portion of the dried slurry recycled to the first stage.

In FIG. 1C, the waste solids are split into two approximately equal streams, with a portion entering the first stage through line 2 and the remainder entering the second stage through line 3. The flow rate of waste solids to each stage is sufficient to replace the water being evaporated in each stage. The amount of water evaporated in each stage depends upon many factors, such as the quantity and quality of the heating source, the temperatures and flow rates of the exit streams, and heat losses to the environment. Since the vapors evaporated from one stage are typically used as the heating source for one other stage, the amounts of water evaporated in the different stages are often similar and preferably "approximately equal", but are almost never actually the identical. In Line 11 corresponds to the solvent entering the second stage. Line 5 corresponds to the partially-dried slurry leaving the second stage.

FIG. 1A represents a simple sequential flow scheme without solids recycle. Table IA shows the material balance for the scheme in FIG. 1A based on the simplifying approximation that one-third of the water is evaporated in each stage.

TABLE IA

| | MATERIAL BALANCE FOR FIG. 1A | | | | |
|---|---|---|---|---|---|
| | Flow Rate (Pounds per hour) | | | | Solids |
| Line No. | Solids | Water | Solvent | Total | Solids + Water |
| 1 | 100 | 400 | 0 | 500 | 0.20 |
| 4 | 100 | 267 | 600 | 967 | 0.27 |
| 6 | 100 | 133 | 600 | 833 | 0.43 |
| 7 | 100 | 0 | 600 | 700 | 1.00 |
| 10 | 0 | 0 | 600 | 600 | — |
| 12 | 0 | 133 | 0 | 133 | 0.00 |
| 13 | 0 | 133 | 0 | 133 | 0.00 |
| 14 | 0 | 133 | 0 | 133 | 0.00 |

The water content of the solids dispersed in solvent, but calculated on a solvent-free basis, determines the tendency for sticky solids to form. This parameter, hereinafter referred to as "solids fraction", is represented in the material balance as the weight of solids over solids plus water. As the solids fraction increases, the concentration of water decreases, thereby reducing the amount of free water potentially present and reducing the tendency for the solids to be sticky. The amount of water which results in sticky solids depends upon the characteristics of the solids. For example, with anaerobically digested municipal sludges, the solids have a tendency to become sticky when the solids fraction drops below about 0.35. As shown in Table IA, the slurry in the first stage of evaporation (line 4) has a solids fraction of 0.27 and would result in the formation of sticky solids. Addition of an appropriate surface active agent to the input material could create a good dispersion and prevent the formation of sticky solids in the first stage of evaporation, as disclosed in U.S. Pat. No. 4,702,798.

Alternatively, a portion of the dried solids in solvent can be recycled to increase the solids concentration of the combined feed to the first stage of evaporation. FIG. 1B shows a simplified block flow diagram for such a processing scheme. As shown in the corresponding material balance in Table IB, 100 percent recycle of dried solids increases the solids fraction in the first stage of evaporation (line 4) from 0.27 to 0.43.

TABLE IB

MATERIAL BALANCE FOR FIG. 1B

| Line No. | Flow Rate (Pounds per hour) | | | | Solids |
|---|---|---|---|---|---|
| | Solids | Water | Solvent | Total | Solids + Water |
| 1 | 100 | 400 | 0 | 500 | 0.20 |
| 4 | 200 | 267 | 1200 | 1667 | 0.43 |
| 6 | 200 | 133 | 1200 | 1533 | 0.69 |
| 7 | 200 | 0 | 1200 | 1400 | 1.00 |
| 8 | 100 | 0 | 600 | 700 | 1.00 |
| 9 | 100 | 0 | 600 | 700 | 1.00 |
| 10 | 0 | 0 | 600 | 600 | — |
| 12 | 0 | 133 | 0 | 133 | 0.00 |
| 13 | 0 | 133 | 0 | 133 | 0.00 |
| 14 | 0 | 133 | 0 | 133 | 0.00 |

A solids fraction of 0.43 is safely above the 0.35 level where gummy solids have a tendency to form. As shown, this amount of recycled dried solids results in a doubling of the solids and solvent rates flowing through all stages of evaporation (lines 4, 6, and 7).

FIG. 1C shows a simplified block flow diagram of the present invention embodying three stages of evaporation. As shown in the corresponding material balance in Table IC, a solids fraction of 0.43 is achieved in the first and second stages of evaporation (lines 4 and 5) without resorting to recycle. Thus, sticky solids can be avoided without the added expenses associated with surface active agents and recycled solids.

TABLE IC

MATERIAL BALANCE FOR FIG. 1C

| Line No. | Flow Rate (Pounds per hour) | | | | Solids |
|---|---|---|---|---|---|
| | Solids | Water | Solvent | Total | Solids + Water |
| 1 | 100 | 400 | 0 | 500 | 0.20 |
| 2 | 50 | 200 | 0 | 250 | 0.20 |
| 3 | 50 | 200 | 0 | 250 | 0.20 |
| 4 | 50 | 66 | 300 | 416 | 0.43 |
| 5 | 50 | 67 | 300 | 417 | 0.43 |
| 6 | 100 | 133 | 600 | 833 | 0.43 |
| 7 | 100 | 0 | 600 | 700 | 1.00 |
| 10 | 0 | 0 | 300 | 300 | — |
| 11 | 0 | 0 | 300 | 300 | — |
| 12 | 0 | 133 | 0 | 133 | 0.00 |
| 13 | 0 | 133 | 0 | 133 | 0.00 |
| 14 | 0 | 133 | 0 | 133 | 0.00 |

Figure 2:
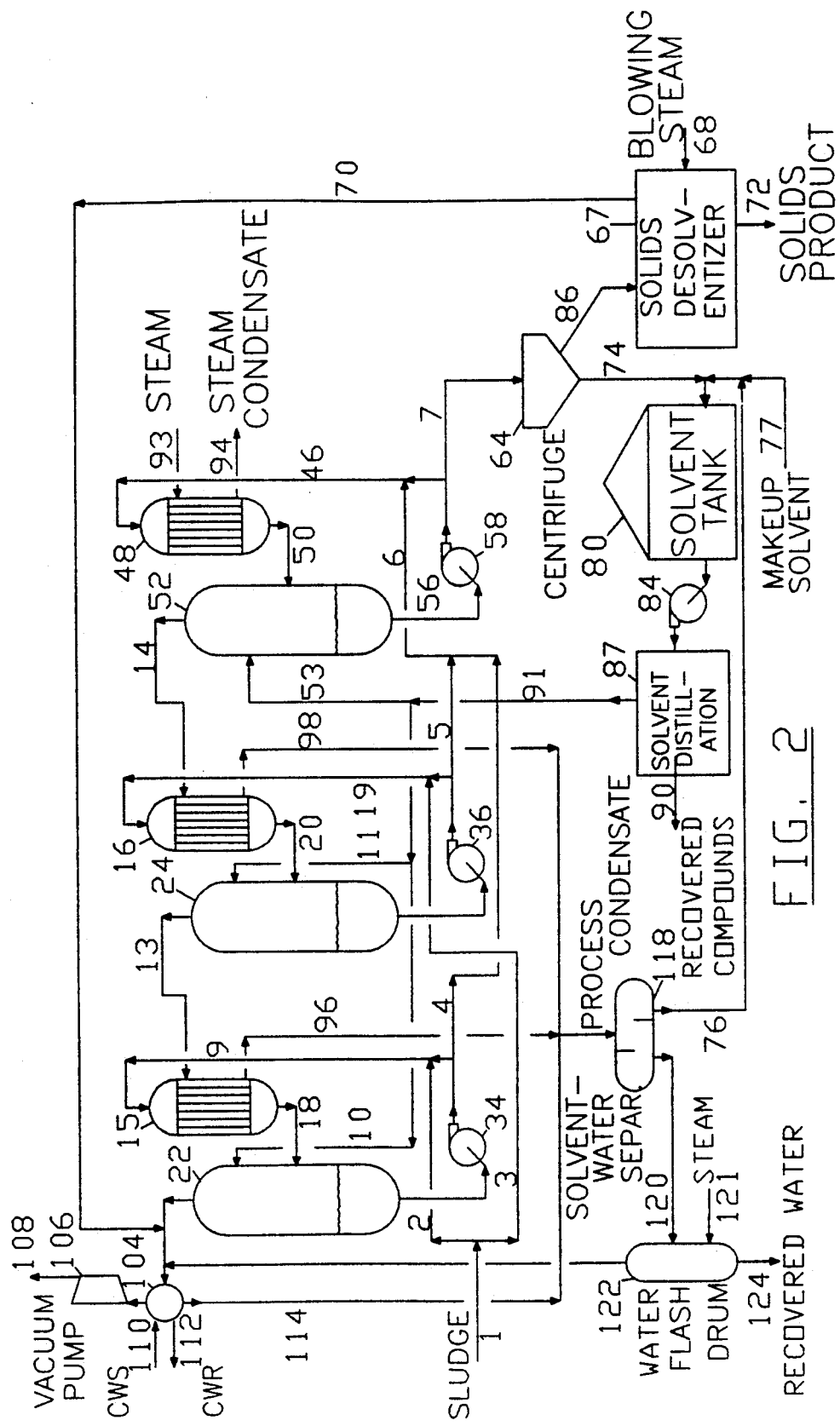
FIG. 2 is a detailed illustration of the preferred embodiment of the dehydration system for practicing the invention represented in the block diagram of FIG. 1C.

FIG. 2 provides a more detailed description of a "parallel feed flow" example of the process wherein a sludge is dried in a relatively volatile solvent. The input sludge contains 18% solids, 2% indigenous solvent-soluble compounds, and 80% water. The process can handle waste solids containing anywhere from less than 1 percent to over 90 percent solids. The line numbers and material balance values described in Table IC apply to FIG. 2 as well.

As defined earlier, an evaporation stage corresponds to equipment in which slurry is heated and a portion of the water and solvent is evaporated and the evolved vapors are separated from the remaining slurry. In FIG. 2, the first stage of evaporation corresponds to vapor-slurry separator 22, pump 34, heat exchanger 15, and the associated connecting piping. The second stage of evaporation corresponds to vapor-slurry separator 24, pump 36, heat exchanger 16, and the associated connecting piping. The third stage of evaporation corresponds to vapor-slurry separator 52, pump 58, heat exchanger 48, and the associated connecting piping. An evaporation stage is not limited to the equipment arrangement used in the present example. Any arrangement that meets the functions defined above is adequate.

The makeup solvent entering through line 77 consists of a hydro-refined paraffin oil having a narrow boiling range with an average boiling point of about 400° F. The input sludge enters the system through input line number 1, is split approximately equally into two parallel lines, 2 and 3, and enters the first and second stages of evaporation in parallel.

In the first stage of evaporation, the input sludge from line 2 mixes with a slurry of partially-dried sludge in solvent from line 17 and passes through line 9 into the tube side of heat exchanger 15. In the heat exchanger, about ⅔ of the water entering the system through line 1 (plus a portion of the solvent) is vaporized. The first stage of evaporation usually operates at a subatmospheric pressure, typically between 2 and 10 psia. The temperature of the slurry entering heat exchanger 15 through line 9 is typically 100° to 250° F., depending on the operating pressure. Heat exchanger 15 is heated on the shell side by mixed steam and solvent vapor from line 13 which is at a temperature higher than the temperature of the slurry on the tube side, typically 20° to 40° F. higher. Condensed water and solvent from heat exchanger 15 is conducted through line 96 to solvent-water separator 118. The slurry and evaporated water leave heat exchanger 15 through line 18 and enters vapor-slurry separator 22, where the vapor is separated from the slurry and enters line 12. The slurry is pumped out of vapor-slurry separator 22 through line 30 using pump 34. Most of the slurry passes through line 17, mixes with input material from line 2, and recycles back to heat exchanger 15 through line 9. The remaining slurry passes through line 4 and feeds the third evaporation stage. Replacement solvent is added to vapor-slurry separator 22 through line 10.

The vapor in line 12 mixes with vapor from other parts of the process (through line 70 and line 100) and the combined vapor passes into surface condenser 104, where a substantial portion of the water and solvent vapor is condensed. Cooling water enters and leaves the condenser through lines 110 and 112, respectively. The mixed condensate of water and solvent leaves condenser 104 through line 114 and passes into solvent-water separator 118. The non-condensed vapor from condenser 104 enters vacuum pump 106 and exits the system through vent line 108.

The second stage of evaporation operates in parallel with the first stage of evaporation and has the same features described above for the first stage of evaporation, except that the operating pressure and temperature is higher. The input sludge enters the second stage of evaporation through line 3.

Product slurry streams from the first and second stages of evaporation pass through lines 4 and 5, respectively, and mix to form the combined slurry feed (line 6) to the third stage of evaporation. The combined feed mixes with dried or partially-dried slurry from line 44 and passes through line 46 into the tube side of heat exchanger 48. In the heat exchanger, the remaining water to be removed from the input material is vaporized. The final stage of evaporation (the third stage in this example) often runs at pressures close to atmospheric pressure, typically in the range of 12 to 17 psia. The temperature of the slurry is typically 200° to 300° F., depending upon the operating pressure. Heat exchanger 48 is heated on the shell side with live steam entering and condensate leaving the heat exchanger through lines 93 and 94, respectively. The slurry and evaporated water leave heat exchanger 48 through line 50 and enters vapor-slurry separator 52, where the vapor is separated from the slurry and enters line 14. The slurry is pumped out of vapor-slurry separator 52 through line 56 using pump 58. Most of the slurry passes through line 44, mixes with input material from line 6, and recycles back to heat exchanger 48 through line 46. The net product slurry from the third stage of evaporation passes through line 7 into centrifuge 64. Replacement solvent is added to vapor-slurry separator 52 through line 53.

Solids cake from centrifuge 64 passes through line 66 into solids desolventizer 67, where blowing steam from line 68 is used to evaporate most of the residual solvent on the solids. The virtually solvent-free solids leaves the battery-limits of the process through line 72. The blowing steam and evaporated solvent leave the solids desolventizer through line 70 and mix with the vapors leaving vapor-slurry separator 22 through line 12. The design of a solids desolventizer can vary considerably from the present example and is described in more detail in U.S. Pat. Nos. 4,270,974 and 4,518,458, the disclosure of which are herein incorporated by reference. An example of a desolventizer consists of an externally heated vessel in which the solids are slowly turned and pushed with rotating impellers and blowing steam is purged through the vessel to have intimate contact with the solids. U.S. Pat. No. 4,518,458, discusses an alternate version in which a heated recirculating purge gas in purged through the vessel instead of blowing steam.

Centrate removed by centrifuge 64 passes to solvent tank 80 through lines 74 and 78 for reuse in the process.

The solvent-water separator 118 receives solvent-water condensates from the surface condenser 104 through line 114, from the first stage heat exchanger 15 through line 96, and from second stage heat exchanger 16 through line 98. Inside solvent-water separator 118, the water is gravity separated from the solvent. The solvent is recirculated to solvent tank 80 through line 76. The water separated in solvent-water separator 118 is fed to water flash drum 122 through line 120. In water flash drum 122, almost all of the non-dissolved solvent left in the water is evaporated and passes into line 100. Sufficient supplemental steam is added through line 121 to cause of small fraction (less than 20 percent) of the water to be evaporated, thereby accomplishing the desired level of solvent removal. This system of removing residual solvent from the separated water is preferred over conventional coalescers since it is not hampered by the presence of residual fine solids which are typically present in the process condensates. Recovered water leaves the battery-limits of the process through line 124.

Makeup solvent is added to solvent tank 80 through line 77. Makeup and recycle solvent is fed to solvent distillation system 87 using pump 84. In solvent distillation system 87, solvent soluble compounds extracted from the input sludge are recovered from the solvent by suitable means, such as fractional distillation. The recovered extracted compounds leave the battery-limits of the process through line 90. The purified solvent is recirculated back to the vapor-slurry separators through line 91. The design of solvent distillation system 87 can vary considerably and some versions are described in U.S. Pat. No. 4,289,578, the disclosure of which is herein incorporated by reference. An example of a solvent distillation system consists of a single stage flash in which most of the solvent is evaporated overhead, and the non-evaporated liquid, composed of approximately 50 percent solvent and 50 percent indigenous solvent-soluble compounds, is subsequently fed to a second flash stage in which stripping steam is added to evaporate virtually all of the remaining solvent from the indigenous solvent-soluble compounds.

Figure 3:
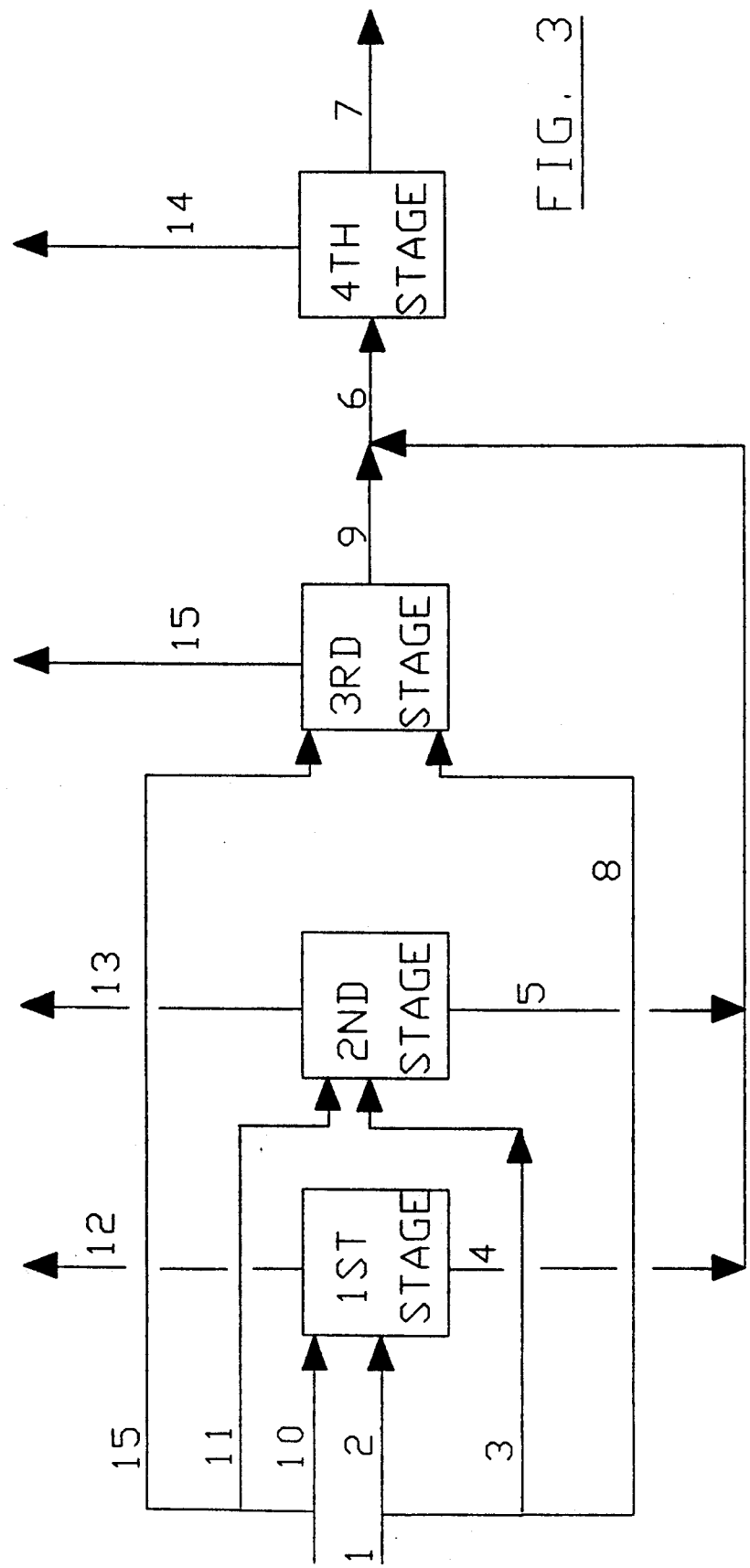
FIG. 3 is a block diagram of the dehydration system of the present invention with four stages of evaporation.

While the invention has been illustrated in FIG. 1 for an example involving three stages of evaporation (two "parallel feed flow" stages followed by a third drying stage in series, with counter-current sequential flow for the evolved vapors), the invention may be used with other evaporation configurations as well. For example, it may be advantageous to have three or more "parallel feed flow" stages, followed in series by none, one or two drying stages. FIG. 3 shows a simplified block flow diagram of the present invention embodying 4 stages of evaporation. In FIG. 3, the input waste solids are fed to the first, second, and third evaporation stages in parallel at approximately equal rates.

The flow rates of the parallel input waste solids streams are typically similar, but not necessarily so. The quantity of waste solids fed to a given stage is a function of the quantity of water evaporated from that stage.

Figure 4:
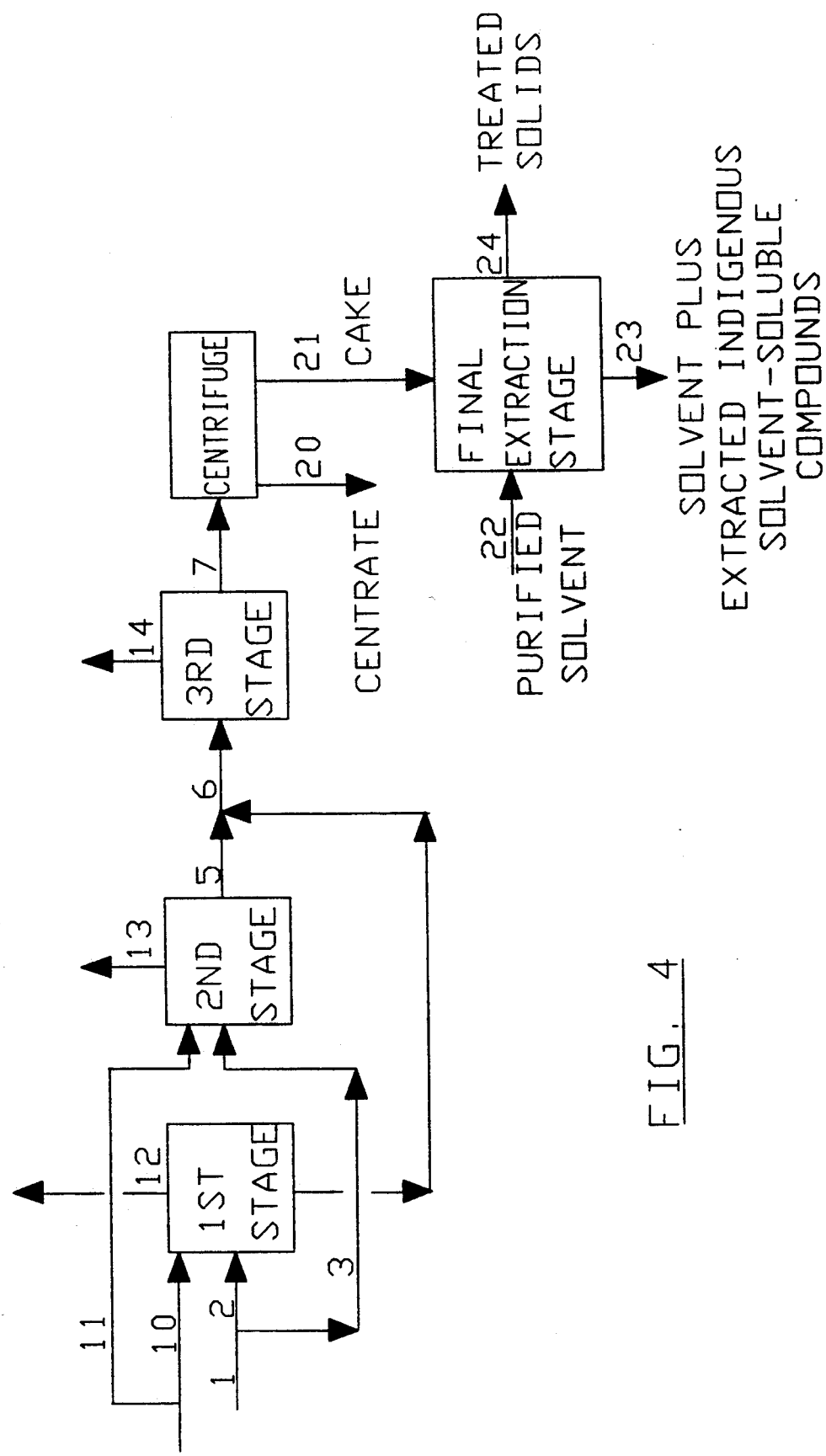
FIG. 4 is yet another version of the dehydration system of the present invention modified from that of FIG. 1C.

In another variation, the evaporation stages are combined in series with one or more "extraction stages". By way of definition, "extraction stage" refers to equipment in which the waste solids or centrifuge cake are intimately contacted with purified recycled solvent (containing relatively low concentrations of indigenous solvent-soluble compounds), with or without any evaporation taking place, a portion of the indigenous solvent-soluble compounds in the solids are extracted by and dissolved in the contacting solvent, and most of the solvent is subsequently separated from the solids in a centrifuge (or other apparatus for separating liquids from solids). The purpose of an multiple extraction stages is to increase the degree of extraction of indigenous solvent-soluble compounds. The number and integration of extraction stages in the present invention can vary considerably. An example is illustrated in FIG. 4, in which the partially dried and extracted slurry leaving the fourth stage of evaporation (line 7) is centrifuged and the resulting centrifuge cake (line 21) is recontacted with purified solvent (line 22) and then centrifuged to separate the solvent containing extracted indigenous solvent-soluble compounds (line 23) from the treated solids (line 24).

In still another variation, the input sludge in line 2 of FIG. 2 is combined with recirculating slurry in line 17 using an agitated mixing tank. The input sludge in line 3 is also combined with recirculating slurry in line 20 using an agitated mixing tank. In a further variation, the agitated mixing tanks for the parallel feed flow evaporation stages may be combined into a single mixing tank, with the slurries from each stage passing into and out of the single mixing tank in parallel.

In another variation, the centrifuge cake is sent to battery-limits without passing first through a solids desolventizer. This is often practiced when the solids are to be burned to produce energy.

What is claimed is:

1. A continuous evaporation process comprising the steps of:
   (a) Using a water immiscible solvent for drying water-containing waste solids into a dehydrated product, with virtually all of the water removed from the dehydrated product, and with minimal formation of sticky solids;
   (b) forming a wet slurry mixture of said water containing waste solids and said water immiscible solvent, with said water immiscible solvent composed of a hydrocarbon compound having an atmospheric boiling point above 300° F. and a viscosity of less than 500 centipoise;
   (c) passing said wet slurry mixture through a dehydration operation to remove virtually all of the water from said waste solids, with minimal formation of sticky solids, and with said dehydration operation including a plurality of at least three stages of evaporation;
   (d) feeding said wet slurry mixture concurrently to at least the first two stages of evaporation arranged in parallel, and to the final stage of evaporation arranged in series;
   (e) separating the dehydrated waste solids from the water immiscible solvent from the final stage of evaporation; and
   (f) recycling said water immiscible solvent separated from said dehydrated waste solids in said continuous process for forming said wet slurry mixture.

2. A process, as defined in claim 1, wherein said waste solids includes from about one percent (1%) to about ninety percent (90%) solids, from about ten percent (10%) to ninety-nine percent (99%) water, and from eighty-nine percent (89%) to zero percent (0%) indigenous solvent-soluble compounds.

3. A process, as defined in claim 2, wherein said separating step comprises a mechanical stage of separation to separate a substantial portion of the solvent from said dehydrated waste solids.

4. A process, as defined in claim 3, wherein said separated solvent is fed to a solvent distillation system wherein said water immiscible solvent is recovered and separated from the indigenous solvent-soluble compounds.

5. A process, as defined in claim 2, wherein said wet slurry mixture is fed in approximately equal volume percent to each of said parallel stages of evaporation.

6. A process, as defined in claim 5, wherein said dehydration operation comprises four stages of evaporation, with the first three stages of evaporation arranged in parallel, feeding the fourth stage of evaporation arranged in series.

7. A process, as defined in claim 5, further comprising the step of extracting said indigenous solvent soluble compounds from said waste solids either before, after or during any of the stages of evaporation by contracting said waste solids with purified water immiscible solvent, and separating the solvent containing extracted indigenous solvent soluble compounds from the treated waste solids.

8. A process, as defined in claim 6, wherein each stage of evaporation includes a vapor slurry separator, a heat exchanger, and a pump.

9. A process, as defined in claim 8, wherein said separated water is further treated in a water flash drum to evaporate the non-dissolved solvent left in the water.

10. A process, as defined in claim 9, wherein said wet slurry mixture is formed by combining waste solids with water immiscible solvent in an agitation tank.

11. A process, as defined in claim 4, wherein said separating step further comprises a further stage of separation, wherein said separated waste solids from the first stage is passed through a solids desolventizer to recover residual solvent on the solids.

* * * * *